United States Patent [19]

Kramer

[11] 3,931,771
[45] Jan. 13, 1976

[54] EXTENDABLE EDUCATIONAL MODULE

[76] Inventor: Edward J. Kramer, Rte. 1, Box 846, Clinton, Wash. 98236

[22] Filed: Mar. 6, 1974

[21] Appl. No.: 448,706

[52] U.S. Cl. .................. 108/77; 108/60; 108/149; 160/135; 312/196
[51] Int. Cl.² .................. A47B 17/03; A47B 37/00
[58] Field of Search ............. 35/60; 108/60, 64, 65, 108/69, 77, 78, 111, 149; 160/135, 351; 312/140.2, 194–196, 262

[56] References Cited
UNITED STATES PATENTS

| | | | |
|---|---|---|---|
| 1,432,663 | 10/1922 | Brandts | 312/195 X |
| 2,771,334 | 11/1956 | Wahlbom | 160/135 X |
| 3,406,645 | 10/1968 | Monroe | 108/111 X |
| 3,533,362 | 10/1970 | Thompson | 108/64 |
| 3,690,365 | 9/1972 | Thompson | 160/135 |

FOREIGN PATENTS OR APPLICATIONS

| | | | |
|---|---|---|---|
| 1,333,426 | 9/1962 | France | 312/262 |

*Primary Examiner*—Roy D. Frazier
*Assistant Examiner*—William E. Lyddane
*Attorney, Agent, or Firm*—Cole & Jensen

[57] ABSTRACT

A carrel-like module which, in one configuration, accommodates a single user, and in an expanded configuration, accommodates two or more users. The carrel module includes an arcuate shaped writing panel, preferably having a concavely shaped rear edge opposite from a seated user and a convexly shaped near edge presented adjacent the seated user, with two end edges, respectively, connecting the rear and near edges. The end edges and the rear edge are bounded by upright panels, the panels extending generally above the writing panel to the head level of the seated user. The two panels presented adjacent the respective end edges are rotatably connected to leg-like support members located at corners of the writing panel formed by the intersection of the rear edge and the end edges, respectively, of the writing panel. The end panels are removably secured to the writing panel, such that they may be conveniently disengaged therefrom, and rotated about their associated leg members by the user. The associated leg members include integral stop elements arranged therewith to prevent further rotation of the end panels when they are coplanar with the nearest panel presented adjacent the rear edge. Hinged to the respective end edges of the writing panel are writing panel extensions, which extensions are held against the undersurface of the writing panel in the closed position. When the end panels are rotated to be coplanar with their adjacent rear edge panels, the writing panel extensions may be rotated from their closed position about the respective writing panel edges to an extended position coplanar with the writing panel, so as to extend the surface of the writing panel adjacent the rotated end panels.

12 Claims, 11 Drawing Figures

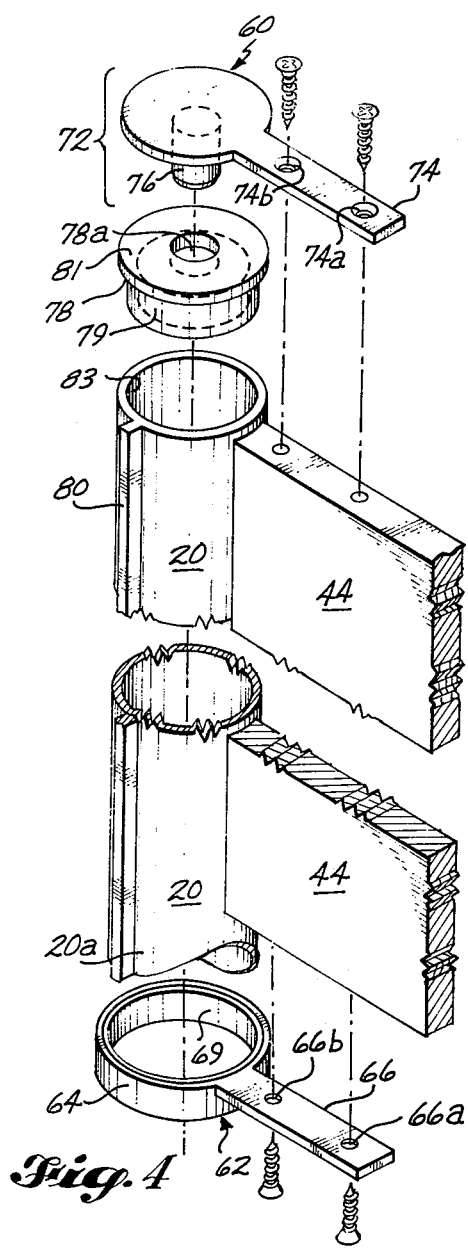
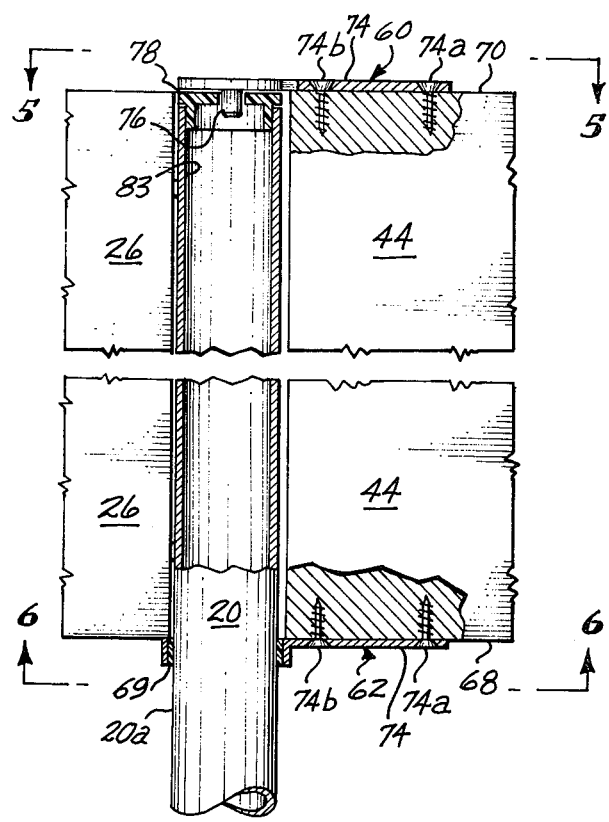
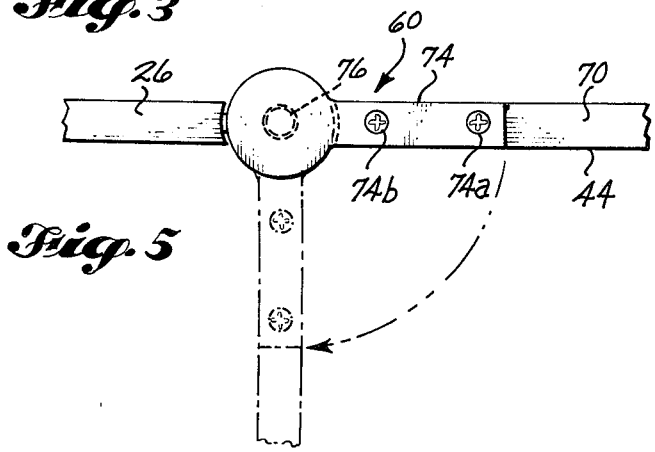
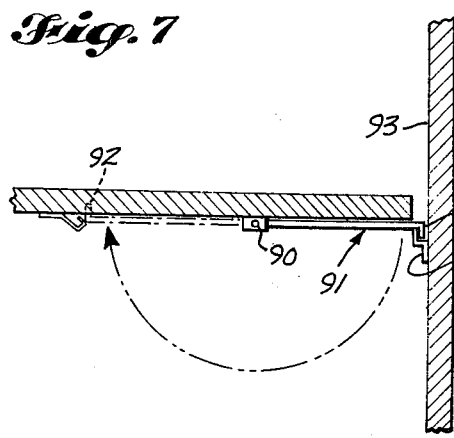
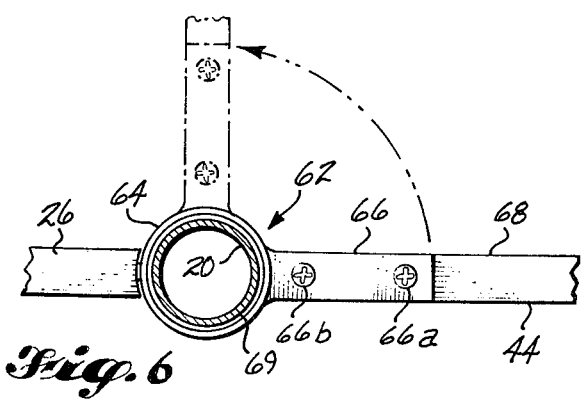

3,931,771

EXTENDABLE EDUCATIONAL MODULE

BACKGROUND OF THE INVENTION

This invention relates generally to modular structures and more specifically to carrel-like modules.

The concept of a partially enclosed unit with a writing surface for individual instruction or study is well-known in the art, and there are many variations of such structures, referred to as carrels, in existence. Typically, however, they all include a writing surface member which is held in a generally horizontal position at a height convenient for use by a seated student. Additionally, a substantial portion of the writing surface is typically bounded by upright panels, the panels extending sufficiently high to provide a certain amount of privacy for the user. A top or cover for the carrel may sometimes be provided.

Typically, such carrels are configured and adapted for use by a single individual. Frequently, however, it is preferable for two or more students to study or to receive the instruction available in specialized carrels in concert, for purposes of cross-testing and reinforcement. Because the carrels of the prior art are unable to accommodate two or more users, such educational flexibility is not possible. Furthermore, expensive educational aids, such as closed circuit television, slide projectors, and tape recorders are not used efficiently with one-user carrels, and thus may be unavailable because of cost in a number of circumstances where they could otherwise provide significant educational benefit at a reasonable expense for small groups of students.

Accordingly, it is a general object of the present invention to overcome the disadvantages of carrel modules known in the prior art.

It is another object of the present invention to provide a carrel module which in one operating position is suitable for use by one student alone.

It is a further object of the present invention to provide a carrel module which in another operating position may accommodate two or more students.

It is a still further object of the present invention to provide a carrel module having a writing surface which may be extended in at least one direction.

It is another object of the present invention to provide a carrel module wherein selected panels adjacent the carrel writing surface may be conveniently moved to enlarge the carrel.

SUMMARY OF THE INVENTION

Accordingly, the present invention includes a horizontally disposed writing panel having a near edge, a rear edge, and two end edges connecting the near and rear edges, the writing panel being connected to and supported by supporting means. Vertical panels are positioned adjacent the end edges and the rear edge of the writing panel and extend above it a given distance, thereby providing a partially enclosed space about the writing panel. Support means are provided along a vertical line which passes through the intersection point of the rear writing panel and one of its end edges, to which is connected for movably positioning one end panel relative to its adjacent writing panel end edge.

DESCRIPTION OF THE DRAWINGS

FIG. 3 is a partial cross-sectional view of the top and bottom hinge configuration for connection of end panels to leg members.

FIG. 4 is a partial isometric view of top and bottom hinge configuration of FIG. 3.

FIG. 5 is a top plan view of the top hinge of FIGS. 3 and 4, showing closed and open positions thereof.

FIG. 6 is a bottom plan view of the bottom hinge of FIGS. 3 and 4, showing closed and open positions thereof.

FIG. 7 is an elevational view of the support structure for the writing panel extensions.

DESCRIPTION OF THE PREFERRED EMBODIMENT

Figure 1:
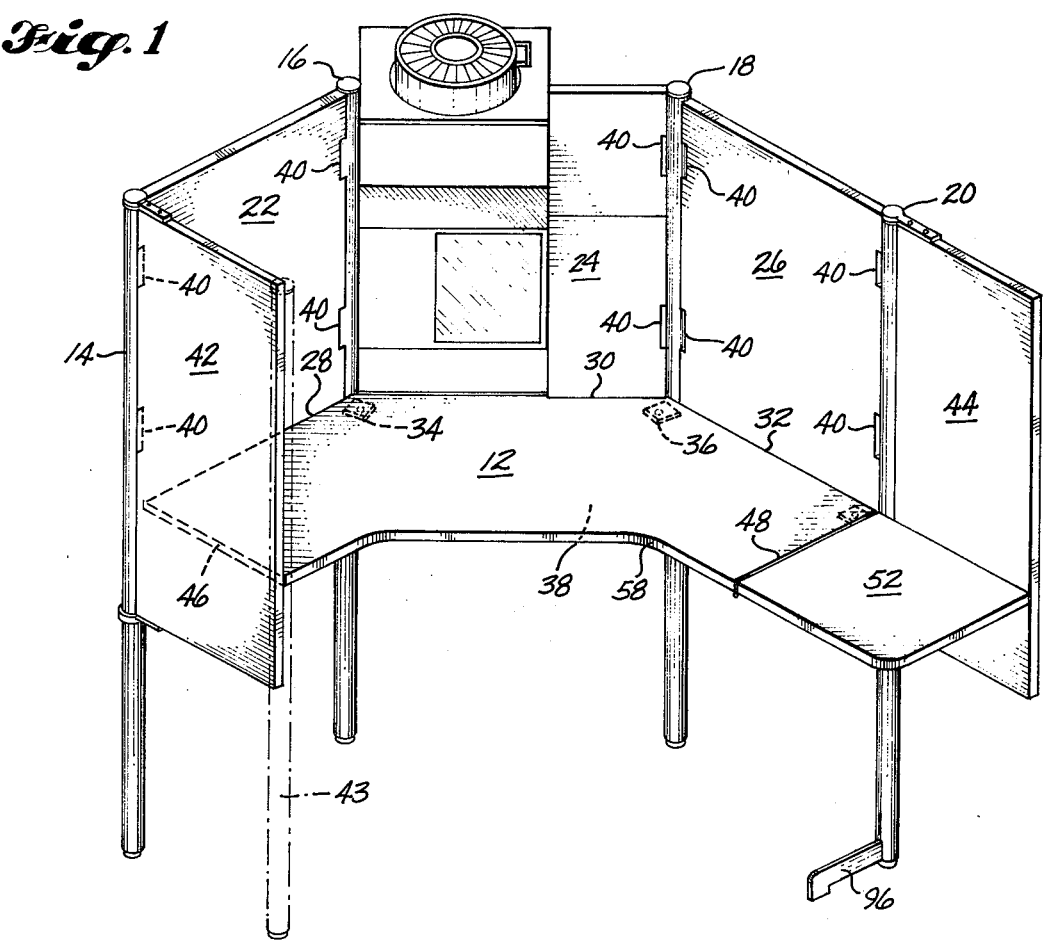
FIG. 1 is an isometric view of a carrel module wherein one end panel is permanently secured to the writing panel and the other end panel is rotatable away from the writing panel.
Figure 2:
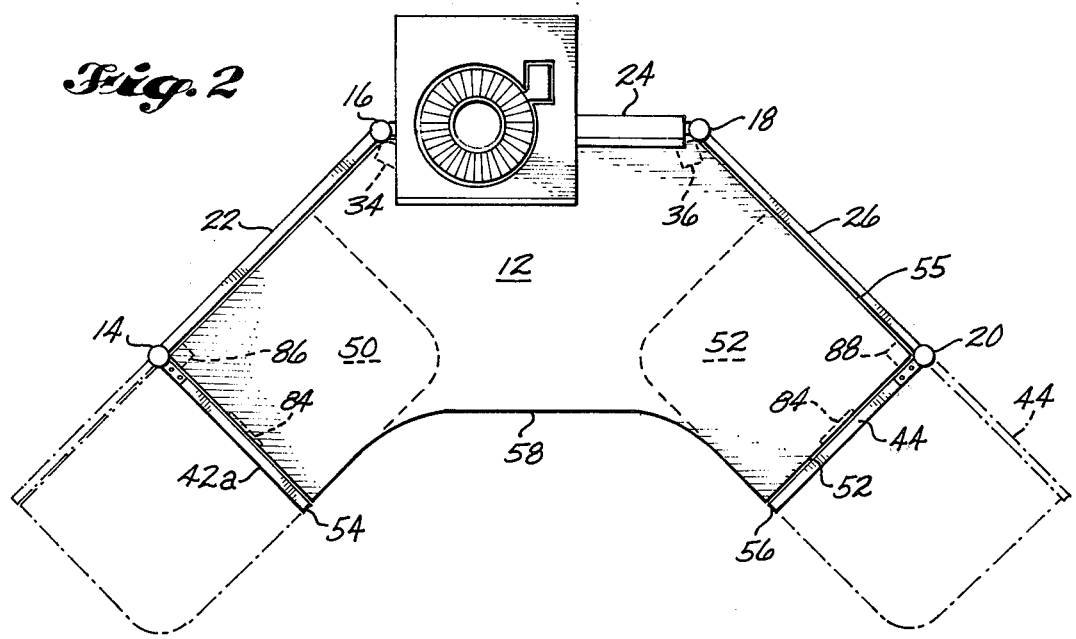
FIG. 2 is a plan view of a carrel module showing the open and closed positions of both the respective rotatable end panels and the corresponding writing panel extensions.

FIGS. 1 and 2 show a carrel module which illustrates the module extending concept of the present invention. A similar educational module which is adapted for the use of a single student is more fully described in patent application Ser. No. 287,842, entitled "CLUSTERABLE LEARNING MODULE", by Edward J. Kramer, the present inventor. Generally, the carrel module described in that application, which is suitable generally for use with the present invention, includes an arcuate shaped writing panel 12 and a plurality of leg-like support members 14, 16, 18 and 20, which are secured to, and in turn support, the writing panel 12 in a generally horizontal position. Upright panels 22, 24 and 26 extend between and are connected to successive leg members, and are presented adjacent to but not contacting successive edge portions 28, 30 and 32 of the writing panel 12. The panels 22, 24 and 26 typically extend from slightly below the writing panel 12 to the head level of a seated user, for purposes of privacy. Selected leg members 16 and 18 preferably include horizontally disposed brackets 34 and 36 welded thereto, which support the writing panel 12 on the undersurface 38 thereof. Typically, bolts or similar attaching means are provided to secure the metal brackets 34 and 36 to the writing panel 12.

The upright panels 22, 24 and 26 may be removably securable to their associated leg members, so that selected panels may be removed without disturbing the rest of the assembled structure. Specialized panels containing instruction equipment such as closed circuit television, tape recorders or the like or other panels having specialized surfaces such as cork or blackboard may thus be substituted at will for the existing panels. Such a specialized panel is shown as panel 24 in FIGS. 1 and 2. Although the panels may be made removable in many ways, a clip and pin configuration is typically used, wherein each panel edge adjacent a leg member is grooved and cut out to accommodate a spring clip, the spring clips capable of receiving pin-like projections located on the face of the leg members. Thus, by moving the upright panels vertically to release the pins from their respective clips, and then transversely when the pins are coincident with cutout portions 40—40, an individual panel may be easily and conveniently removed, without disturbing the structural integrity of the remainder of the carrel.

The carrel disclosed in the above-identified application preferably includes end panels positioned adjacent to but not contacting writing panel edges 46 and 48 and nonremovably secured to the writing panel 12 by metal brackets or similar structure. End panel 42 and leg member 43 (dotted lines) of FIG. 1 illustrate this configuration. Such a configuration provides a study carrel which results in a substantial amount of privacy for study and instruction, an efficient and comfortable use of available writing panel space, and permits the user to comfortably utilize the instructional possibilities of all three back panels 22, 24 and 26, if desired. Such a carrel is, however, limited to use by a single student.

Referring to FIG. 1 and especially FIG. 2, the carrel extending structure of the present invention is illustrated in the context of the carrel disclosed in application Ser. No. 287,842, and briefly explained above. The invention should not be considered limited, however, to such a configuration. End panels 42a and 44 are made rotatably connected to leg members 14 and 20, and removably secured to writing panel 12, so that the end panels 42a and 44 may be rotated about leg members 14 and 20 from a closed position adjacent to but not contacting the writing panel end edges 46 and 48, respectively, (illustrated by the solid line position of panels 42a, 44 in FIG. 2) to an open or extended position coplanar with respective adjacent upright panels 22 and 26 (illustrated by dashed line position in FIG. 2). In the closed position end panels 42a and 44 extend slightly beyond the near edge 58 of the writing panel 12 adjacent the end panels into the region partially bounded by the edge 58, and provided for a seated user. Extension of edges 46 and 48 thereof, is provided by two extension panels 50 and 52, which are hinged to the respective end edges of writing panel 12. The two extension panels are normally held in a closed position adjacent the undersurface 38 of writing panel 12 by a spring snap (not shown) or other suitable means. After the two movable end panels 42a and 44 are rotated away from the respective end edges of the writing panel, the extending panels 50 and 52 may be rotated from their closed position to an open (extended) position coplanar with the writing panel 12, resulting in an arcuate writing panel extended at the respective end edges thereof.

Figure 9:
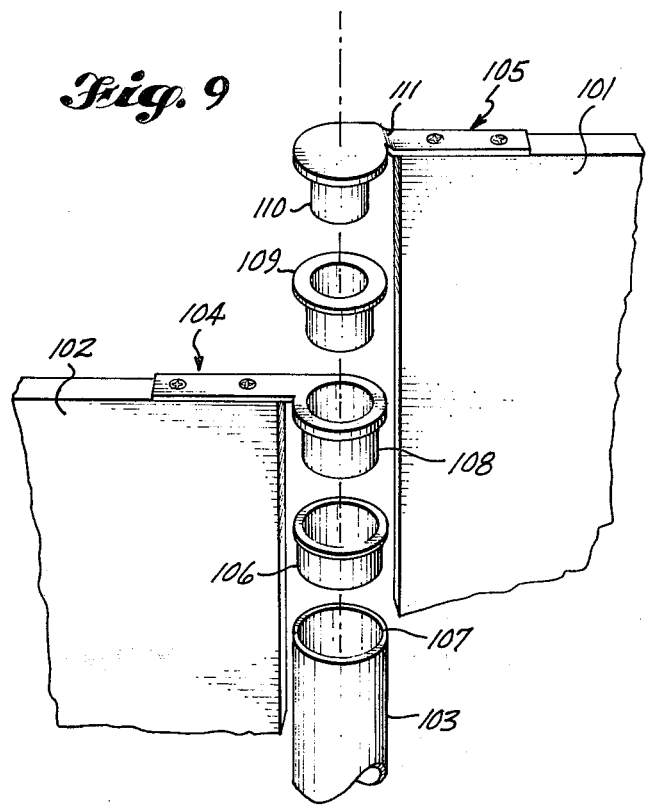
FIG. 9 is an exploded isometric view of the top hinge construction for the rotatable end panels when two end panels are common to a single leg member.
Figure 10:
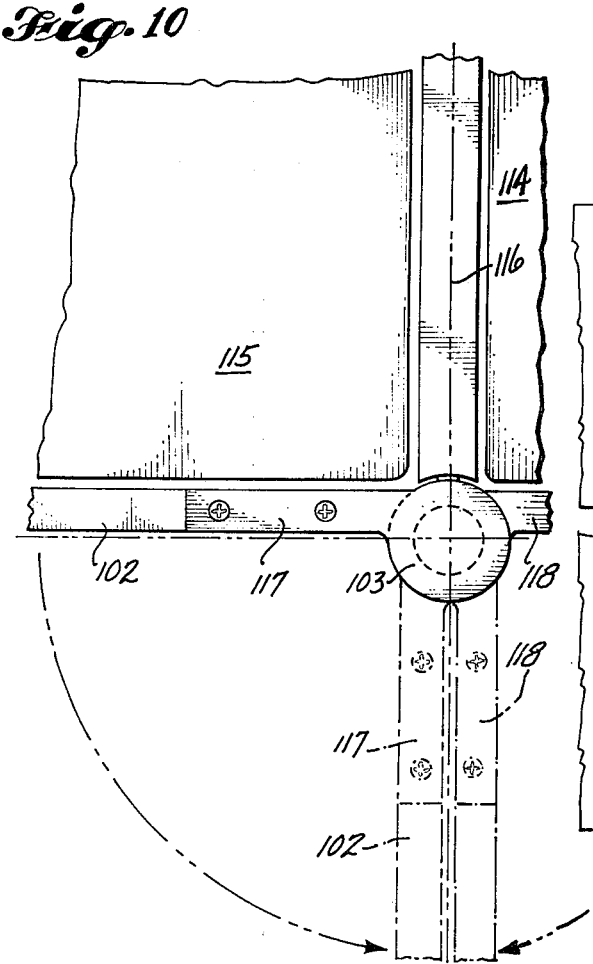
FIG. 10 is a top plan view showing a portion of two clustered modules having respective end panels common to a single leg member.
Figure 11:
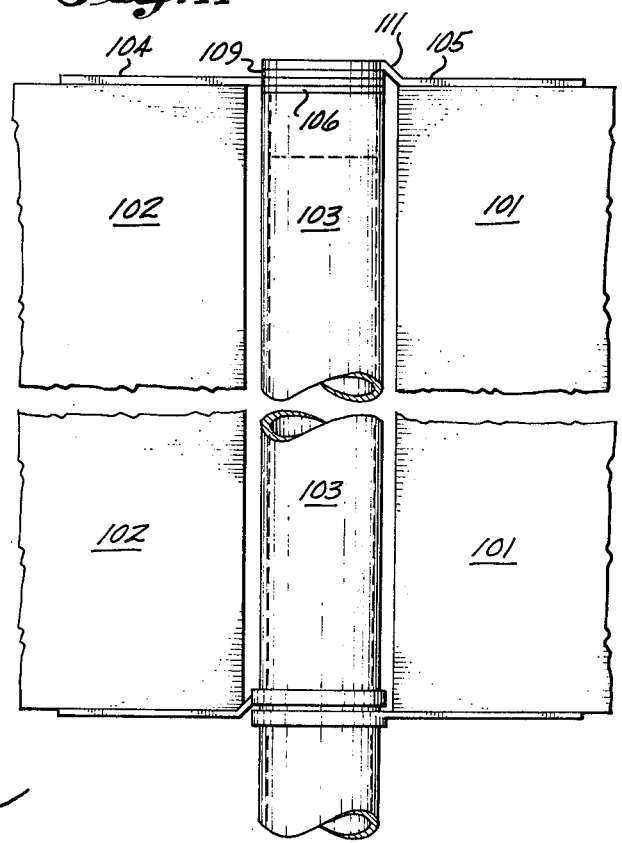
FIG. 11 is a partial elevation view showing the top and bottom hinge construction of two end panels common to a single leg member.

Referring to FIGS. 3–6, suitable means for rotatably connecting one end panel to its associated leg member is shown. Panel 44 is shown with leg member 20 and adjacent panel 26 by way of example. FIGS. 3–6 illustrate rotatable connecting means suitable for use with a carrel which is to be used alone. Modified connecting structure, such as shown in FIGS. 9–11, is necessary if the carrels are to be clustered together, as illustrated in the application of Edward J. Kramer noted above.

Referring in detail to FIGS. 3–6, top and bottom hinge members 60 and 62, respectively, are provided to connect rotatable panel 44 to its associated leg member 20. The bottom hinge member 62 comprises a hollow cylinder portion 64 configured to fit over the associated leg member and an elongated bracket portion 66 permanently attached to the cylinder portion 64, and extending radially outward therefrom. The bracket portion 66 has openings 66a–b defined therein for preferable attachment of the bottom hinge member 62 to the bottom edge 68 of panel 44 by suitable securing means such as screws, nails or the like. A bushing 69 may be provided within the cylinder portion 64, fitted between the interior surface of the hollow cylinder portion 64 and the circumferential surface 20a of leg member 20 so that the bottom hinge member 62 and hence panel 44 may be easily rotated about the leg member.

A top hinge member 60 attaches to the upper edge 70 of the panel 44 in substantially the same manner as the bottom hinge member 62 attaches to the bottom panel edge 68. The top hinge member 60 comprises a mushroom-shaped portion 72 and an elongated bracket portion 74 extending radially outwardly therefrom, the elongated bracket 74 having openings 74a–b therein for attachment to the panel 44 in the manner described above. The mushroom-shaped portion 72 includes a stem segment 76, configured to rotatably mate with opening 78a in a top cap 78. The top cap 78 includes a sleeve portion 79, which mates with the interior surface 83 of leg member 20, and a shoulder portion 81, which rests upon the top edge of the leg member.

The rotatable mating of stem segment 76 with top cap opening 78a, and the mating of bushing 69 with circumferential surface 20a provide sufficient rotational resistance such that the panel 44 is prevented from rotating on its own once a desired rotational position has been achieved by a user.

Referring to FIGS. 1, 2 and 7, the writing panel extension 50 and 52 are shown to be rotatably connected to writing panel end edges 46 and 48, respectively by hinges (not shown) or other suitable connecting means. The extensions 50 and 52 may be connected in other ways to the writing panel, or to other portions of the module, such as the interior surfaces of the respective end panels. In the closed position, the extensions 50 and 52 swing out of the way so that they are substantially hidden from view, and so that the end panels 50 and 52 may be rotated adjacent the end edges 46 and 48. In the open position the extensions are held coplanar with the writing panel 12 by a supporting mechanism to be more fully explained in following paragraphs. The extensions are substantially quadrilateral, with the extension edges 52, 55 adjacent the end edges and the panel, respectively, being coextensive with the end edge and the width of the end panel. The extension edges opposite edges 52, 55 are substantially parallel therewith, and the extension defined thereby is a harmonious continuation of the original writing panel 12.

Each extension is held in place by means shown in FIG. 7. A bracket 90 is secured to the undersurface of extensions 50 and 52. Pivotally connected to the bracket 90 is an elongated bar 91 having a lip 92 extending from the free end thereof. The bar has a length sufficient that when the bar 91 is pivoted toward the open end panel in a position adjacent the undersurface of the extension, the lip 92 fits in a receptacle 94 secured to the interior surface 93 of the end panel. The receptacle 94 holds the bar 91, and hence the extension, in the desired position coplanar with the writing panel 12. When the extension is to be in a closed position, the bar is rotated 180° away from the end panel and again positioned adjacent the undersurface of the extensions and is held there by a spring snap (not shown) or similar means.

The circumferential surface of each leg member (e.g., leg member 20) is provided with an outwardly projecting stop member 80, which runs longitudinally with the leg member 20 and is positioned such that the end panels abut the stop 80 when they are coplanar with the adjacent panel, or other desired rotational position. The stop is approximately one-eighth inch wide and extends outwardly approximately 1¼ inches from the surface of its associated leg member. The stop 80 extends from substantially the top edge of the leg member to a point slightly above the position of the bottom hinge member. The length of the stop provides a substantial element for effectively terminating the rotation of the end panels.

When end panels 42a and 44 are in their respective closed positions adjacent the end edges 46 and 48, respectively, of writing panel 12, they are held there by means of magnetic catches 84—84, or other suitable holding means. In this configuration, the carrel module is suitable for use by one student. When the end panels 42a and 44 are rotated from the closed position (solid lines in FIG. 2) to an open position (dashed lines), coplanar with adjacent upright panels 22 and 26, respectively, the carrel module may be used by two or more users simultaneously. In addition, the rotation of the extension panels 50 and 52 from a closed position (dotted lines in FIG. 2) to an open position (dashed lines) provides an increased writing area for the users.

For convenience in the rotation of end panels 42a and 44, there are no leg members provided at the vertical edges 54 and 56 of the respective end panels. Adequate support of end panels 42a and 44 is provided by its respective top and bottom hinge members, which are rotatably secured to adjacent leg members, as explained above. Writing panel 12 is adequately supported by providing leg members 14 and 20 with horizontally disposed brackets 86 and 88, similar to those provided with leg members 16 and 18. Brackets 86 and 88 are permanently secured to the leg members 14 and 20, respectively, and include openings for attachment thereof to the undersurface 38 of writing panel 12 in a similar fashion to that of brackets 34 and 36, described above. Typically, the brakets 86 and 88 are approximately three inches square but other size brackets may, of course, conveniently be used. The brackets 34, 36, 86 and 88, secured to leg members 14, 16, 18 and 20, which are in turn arranged around the concave rear edge of arcuate shaped writing panel 12 provide a strong, stable, carrel module.

In certain carrel configurations, the rotation of the end panels to the extended or open position may cause the carrel module to be slightly unstable. The addition of a foot member 96 (FIG. 1), extending from the base of leg members 14 and 20 and resting on the supporting floor surface will assist in stabilizing the unit.

Figure 8:
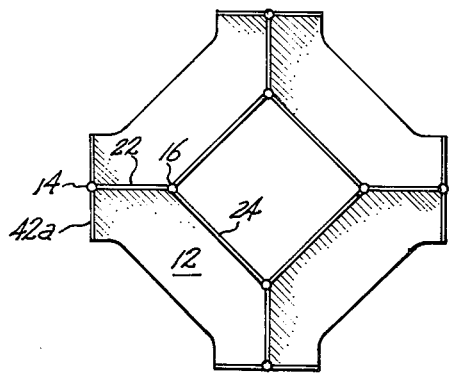
FIG. 8 is a top plan view of one configuration of clustered modules.

Heretofore, the extendable module concept of the present invention has been described in the context of a single carrel module. Some modules, however, may be clusterable, with certain leg members and panel members being common to two modules to form different joined combinations of two or more modules. Such clusterability is more fully illustrated and explained in application Ser. No. 287,842, referenced above. FIG. 8 illustrates one possible clustered configuration using the carrel of FIGS. 1 and 2. The clustering of carrel modules, however, necessitates the use of specially adapted hinge members. For instance, if two modules were to be clustered together in a manner so that panel 22, and leg members 14 and 16 were common to two adjacent modules (FIG. 8), the hinge members joining the respective adjacent end panels of the two modules to leg member 14 would be adapted so that each end panel could be rotated to be parallel with each other and common panel 22.

Referring to FIG. 9, end panels 101 and 102 are illustrated as the respective end panels of adjoining carrel modules. When the two panels are common to a single leg member 103, the top hinges 104 of panel 102, and 105 of panel 101 nest inside each other to form a hinge unit. Typically, each module alone will have a top hinge similar to hinge 104 on one side and a top hinge similar to hinge 105 on the other side. Thus, when two modules are joined together, a combination of hinges 104 and 105 will be present. The hinge unit includes a shoulder sleeve bearing 106, a portion of which fits down inside the leg member 103, and the shoulder of which rests on the upper leg edge 107. An extended ring portion 108 of hinge 104 fits inside the sleeve bearing 106, with another sleeve bearing 109 fitting inside of and resting on the hinge 104. A stem portion 110 of hinge 105 is then fitted within the bearing 109. Hinges 104 and 105 are thus both rotatable in bearings 106 and 109, respectively, relative to leg member 103. The hinge 105 has a slight bend 111 in its elongated bracket portion attaching to panel 101 to maintain the vertical alignment of panels 101 and 102.

Hinge 105 is also provided with an additional sleeve bearing (not shown) which correctly mates sleeve 109, or the stem portion 110, with the leg member 103 when hinge 105 is to be used alone with a given leg member. Hinge 108 may also be provided with a cap (not shown) to cover its opening in the event hinge 108 is to be used alone. When hinge members 104 and 105 are to be combined, however, the additional sleeve bearing and cap are not used.

The bracket portions of each hinge are slightly offset relative to the hinge portion surrounding the leg member, as illustrated in FIGS. 9 and 10. The writing panels 114, 115 of adjacent modules are shown with a common panel 116 and common leg member 103. Panels 101 and 102 (FIG. 10) are shown by the solid lines in their closed positions. Bracket portions 117 and 118 are offset relative to the center of leg member 103 so that upon rotation of the panels 101 and 102 to the open position shown by the dotted lines, panels 101 and 102 are presented adjacent to and parallel with each other and parallel with panel 116. The respective bottom hinges of panels 101 and 102 are likewise offset in a manner similar to that of hinges 104 and 105 to permit such panel rotation.

Although an exemplary embodiment of the invention has been disclosed herein for purposes of illustration, it will be understood that various changes, modifications and substitutions may be incorporated in such embodiment without departing from the spirit of the invention as defined by the claims which follow.

What is claimed is:
1. An educational module comprising:
   a generally horizontally positioned writing panel having a near edge presented adjacent a seated user, a rear edge, and two end edges connecting said near and rear edges, wherein intersections of said two end edges and said rear edge define first and sec- ond writing panel corners;

supporting means for said module, including at least two upright support members which extend from a support surface to a point above said writing panel, said two support members being positioned adjacent said first and second writing panel corners;

vertical panel means partially enclosing said writing panel, said vertical panel means being supported adjacent said end edges and said rear edge of said writing panel, said vertical panel means extending from a point below said writing panel to a point above said writing panel at least to head level of the seated user, said vertical panel means including two end panels supported adjacent said end edges, at least one of said two end panels being movable between two spaced operative positions without disturbing the structural integrity of the module, one of said two spaced positions being adjacent one end edge of said writing panel, the other of said two spaced positions being relatively away from said one end edge of said writing panel; and means securing said vertical panel means to said supporting means, inlcuding first means movably securing said one end panel to one of said two support members, permitting movement of said one end panel between said two spaced positions.

2. The module of claim 1, wherein the other of said two end panels is movable between two spaced operative positions from adjacent said other end edge of said writing panel to relatively away from said other end edge without disturbing the structural integrity of the module, and wherein said securing means includes second means movably securing said other end panel to the other of said two support members, permitting movement of said other end panel between its two spaced operative positions.

3. The module of claim 2, wherein said first and second means movably securing said end panels include means positioned at said first and second writing panel corners for rotatably supporting said one and said other end panels.

4. The module of claim 1, wherein the near edge of said writing panel is concavely shaped, the rear edge is convexly shaped, wherein the end edges of said writing panel intersect the rear edge thereof at substantially a 90° angle and converge toward the near edge thereof and each other at substantially a 90° angle, and wherein said supporting means are positioned only along said rear edge of said writing panel.

5. The module of claim 1, including horizontal bracing members secured to each of said two support members positioned adjacent said first and second writing panel corners, said horizontal bracing members, respectively, being secured to said two support members in the vicinity of, and such that they rest upon, said support surface when the module is in an operative position, thereby providing additional stability to the module.

6. The module of claim 1, including a stop means for stopping said one end panel in said other spaced position.

7. The module of claim 6, including means for holding said one end panel in said other spaced position.

8. The module of claim 6, wherein said one end panel is substantially coplanar with an adjacent vertical panel in said vertical panel means when said one end panel is in said other spaced position.

9. The module of claim 1, including at least one writing panel extension movable between first and second spaced positions and means mounted on said module for permitting movement of said writing panel extension between said first and second spaced positions, said first spaced position being substantially coplanar with said writing panel and adjacent said one end panel when said one end panel is in its other spaced operative position relatively away from said writing panel, said second spaced position of said writing panel extension being relatively away from said first spaced position thereof such that said one end panel is permitted to assume its one spaced operative position adjacent said writing panel when said writing panel extension is in its said second spaced position, said module further including means supporting said writing panel extension in said first spaced position.

10. The module of claim 9, wherein said writing panel includes a top surface exposed to the seated user and an opposing bottom surface, wherein said second spaced position of said writing panel extension is adjacent to and parallel with said bottom surface, and wherein said module further includes means supporting said writing panel extension in said second spaced position.

11. An apparatus of claim 10, wherein said means for permitting movement of said writing panel extension between said first and second spaced positions includes means mounted on said one end edge of said writing panel pivotally connecting said writing panel extension to said writing panel.

12. A generally horizontal writing panel having a near edge presented adjacent a seated user, a rear edge, and two end edges connecting the near and rear edges, respectively, wherein intersections of said end edges and said rear edge define first and second writing panel corners;

means supporting said writing panel, including upright, leg-like support members which extend from a support surface to a point above said writing panel and which are connected to said writing panel at said first and second writing panel corners;

vertical panel means, including first and second end panels, partially enclosing said writing panel, said vertical panel means being positioned adjacent the end edges and the rear edge of said writing panel and extending above and below the writing panel;

means positioned along vertical lines passing through said first and second writing panel corners, respectively, for permitting positioning movable of said first and second end panels relative to their associated end edges, including means rotatably connecting said first and second end panels, respectively, to their associated leg-like support members at said first and second writing panel corners respectively; and, at least one writing panel extension movably secured to said module, and positionable in a first position adjacent a first end edge and its associated first end panel when said first end panel is extended away from said first end edge, with said writing panel extension in said first position being coplanar with said writing panel, and further positionable in a second position when said first end panel is adjacent its associated first end edge.

* * * * *

UNITED STATES PATENT OFFICE
CERTIFICATE OF CORRECTION

PATENT NO. : 3,931,771
DATED : January 13, 1976
INVENTOR(S) : Edward J. Kramer

It is certified that error appears in the above–identified patent and that said Letters Patent are hereby corrected as shown below:

Column 8, line 51, "positioning movable" should be --movable positioning--.

Signed and Sealed this sixth Day of April 1976

[SEAL]

Attest:

RUTH C. MASON
*Attesting Officer*

C. MARSHALL DANN
*Commissioner of Patents and Trademarks*